United States Patent [19]

Morin et al.

[11] Patent Number: 4,684,375
[45] Date of Patent: Aug. 4, 1987

[54] METHOD FOR GASIFYING A MATERIAL USING A CIRCULATING FLUIDIZED BED

[75] Inventors: Jean-Xavier Morin; Michel Marcellin, both of Le Creusot, France

[73] Assignee: Framatome & Cie., Courbevoie, France

[21] Appl. No.: 725,173

[22] Filed: Apr. 19, 1985

[30] Foreign Application Priority Data

Apr. 20, 1984 [FR] France ................. 84-06293

[51] Int. Cl.[4] ............................................... C10J 3/54
[52] U.S. Cl. ........................... 48/197 R; 48/206; 48/DIG. 4; 110/347
[58] Field of Search ............ 48/197 R, 202, 206, 48/DIG. 4, 209, 210; 110/347; 122/4 D

[56] References Cited

U.S. PATENT DOCUMENTS

| 3,884,649 | 5/1975 | Matthews | 48/202 |
| 3,971,639 | 7/1976 | Matthews | 48/202 |
| 4,276,062 | 6/1981 | Lyon et al. | 48/DIG. 4 |

FOREIGN PATENT DOCUMENTS

| 27280 | 4/1981 | European Pat. Off. |
| 82673 | 6/1983 | European Pat. Off. |
| 972840 | 10/1959 | Fed. Rep. of Germany |
| 3035828 | 5/1982 | Fed. Rep. of Germany |
| 2209074 | 6/1974 | France |

OTHER PUBLICATIONS

Baur, "Multisolid Fluidized-Bed Combustor Meets Industry Needs", Power, vol. 127, No. 3, Mar. 1983, pp. 128–129.

*Primary Examiner*—Peter Kratz

[57] ABSTRACT

Method and installation for processing a material in a circulating fluidized bed, in which, in the filtration compartment (4) traversed by the fluidization gas at a speed which is so regulated as to put into suspension only the particles having dimensions smaller than a given limit, the unburnt largest particles (25) which are recovered and are directly recycled in the fluidized bed (21) and the fine particles (24) are subjected in an adjacent compartment (5) to a processing for agglomerating the ashes by forming in the processing compartment (5) a high temperature zone (96), the agglomerated ashes (26) being withdrawn at the base of the processing compartment (5) and the unburnt fine particles (27) being returned to fluidized bed (21) through a recycling circuit (54).

1 Claim, 2 Drawing Figures

4,684,375

METHOD FOR GASIFYING A MATERIAL USING A CIRCULATING FLUIDIZED BED

FIELD OF THE INVENTION

The invention relates to a method and an installation for processing materials in a circulating fluidized bed and is more particularly applicable to the combustion or the gasification of combustible materials.

BACKGROUND OF THE INVENTION

The technique of the fluidized bed is currently employed for the processing of solid granular materials and particularly for the combustion or gasification of solid combustible materials such as coal, lignite, wood and biomass waste.

A fluidized bed processing installation comprises a fluidization reactor formed by an elongated chamber having a vertical axis and provided at its base with means for injecting a fluidization gas with a variable rate of flow. The material is introduced, in the form of particles, in the fluidization chamber above a grating for a homogeneous distribution of the gas. Different fluidization means may be employed.

There is produced in this way inside the fluidization chamber a rising current of gas discharged in the upper part of the chamber and consisting of the fluidization gas and gaseous products issuing from the processing, for example from the combustion of the material. It is known that, in regulating the speed of circulation of the gases, it is possible to operate in accordance with different fluidization rates. The particles start to be put into suspension indeed beyond a minimum fluidization speed. However, if the fluidization speed exceeds a value which may reach, for example, 2 to 6 m/sec and which depends on the particle size and the density of the particles, the major part of the latter is liable to be entrained upwardly with the gases. There is then distinguished inside the fluidization chamber a dense lower zone and a more diluted upper zone which extends up to the upper part of the fluidization chamber, the limit between the two zones being, moreover, indistinct. In its upper part, the fluidization chamber communicates with a circuit for discharging the gases which passes through a separating device of the cyclone type in which the solid particles entrained with the gases are recovered, the latter being discharged, after purification, through an upper outlet of the separator, while the recovered particles accumulate at the base and are discharged through a lower outlet orifice connected to the reactor through a circuit for recycling the recovered particles in the fluidized bed. This recycling circuit is often formed by a conduit in the shape of a syphon or trap in which the particles circulate in a dense form and provide a seal for balancing the pressures between the fluidized bed reactor and the separator.

In the course of their return to the fluidized bed reactor, the recovered particles may be subjected to a processing in an outside device placed either directly in the recycling conduit or branch-connected to the latter. For example, the particles may be passed through a heat exchanger constituted by a vessel in which may be placed a nest of exchange tubes through which a heat-carrying fluid travels. The coefficient of heat transfer is increased if the particles are put into suspension by the circulation of a rising current of fluidization gas introduced in the lower part of the vessel. As the case may be, the particles may be fed at the base of the vessel or in its upper part and may be discharged in the known manner, for example by overflowing toward a recycling conduit which communicates with the reactor.

SUMMARY OF THE INVENTION

An object of the invention is to provide improvements in the operation of such a device so as to improve its efficiency, and the invention moreover enables special processing operations to be carried out.

Indeed, it has been found that the efficiency or yield of the exchanger depend on the size of the particles and in particular on the extent of the particle size spectrum. Indeed, it is easier to regulate the conditions of operation, and in particular fluidization, when particles having a relatively homogeneous particle size are processed. Now, when a fluidized bed operates in a circulating manner, the size of the particles made to circulate cannot be controlled since the fluidization speed is so regulated that the major part of the particles can be entrained with the gases.

In order to overcome this drawback, it is known to subject the recycled particles in the return path to a processing which is carried out with a fluidized bed in an exterior device comprising a filtration compartment traversed by a fluidization gas and a processing compartment adjacent to said filtration compartment.

According to the invention, in the filtration compartment traversed by the fluidization gas at a speed which is so regulated as to put into suspension only the particles having dimensions smaller than a given limit, the unburnt largest particles are recovered and are directly recycled in the fluidized bed and the fine particles are subjected in the adjacent compartment to a processing for agglomerating the ashes by formation in the processing compartment of a high temperature zone, the agglomerated ashes being withdrawn at the base of the processing compartment and the unburnt fine particles being sent back to the fluidized bed through a recycling circuit.

The invention permits in particular an improvement in the efficiency of a fluidized bed heat exchanger placed in the return circuit of a combustion or gasification reactor.

The invention also relates to the installation for carrying out the method employing a special exterior processing device comprising at least two associated compartments, namely a filtration compartment in which the fluidization speed is so regulated as to put into suspension only particles having a dimension less than a given limit and to recover the unburnt particles whose particle size is greater than that of the ashes, and a processing compartment comprising ash agglomerating means, a lower outlet provided with means for withdrawing the agglomerated ashes, and an upper outlet for the unburnt fine particles communicating with the second circuit effecting the recycling to the fluidized bed.

Advantageously, the processing compartment comprises a bottom in the form of a hopper extended downwardly by a tapering conduit on the axis of which extends a conduit for injecting a comburent gas. This conduit has a diameter less than the tapering conduit so as to define an annular space putting the hopper in communication with a lower recovery chamber in which is injected a fluidization gas which rises in the processing chamber through the annular space. The comburent gas-injecting conduit opens onto the center of the lower part of the processing compartment so as to form therein a high temperature zone for the agglomeration of the ashes into rather heavy particles so as to pass into the annular space in a counter-current manner relative to the fluidization gas and fall into the lower recovery chamber from which they are discharged through a withdrawing device.

BRIEF DESCRIPTION OF THE DRAWINGS

The invention will be better understood from the following description of two embodiments which are given by way of example and shown in the accompanying drawings, in which.

DETAILED DESCRIPTION

Figure 1:
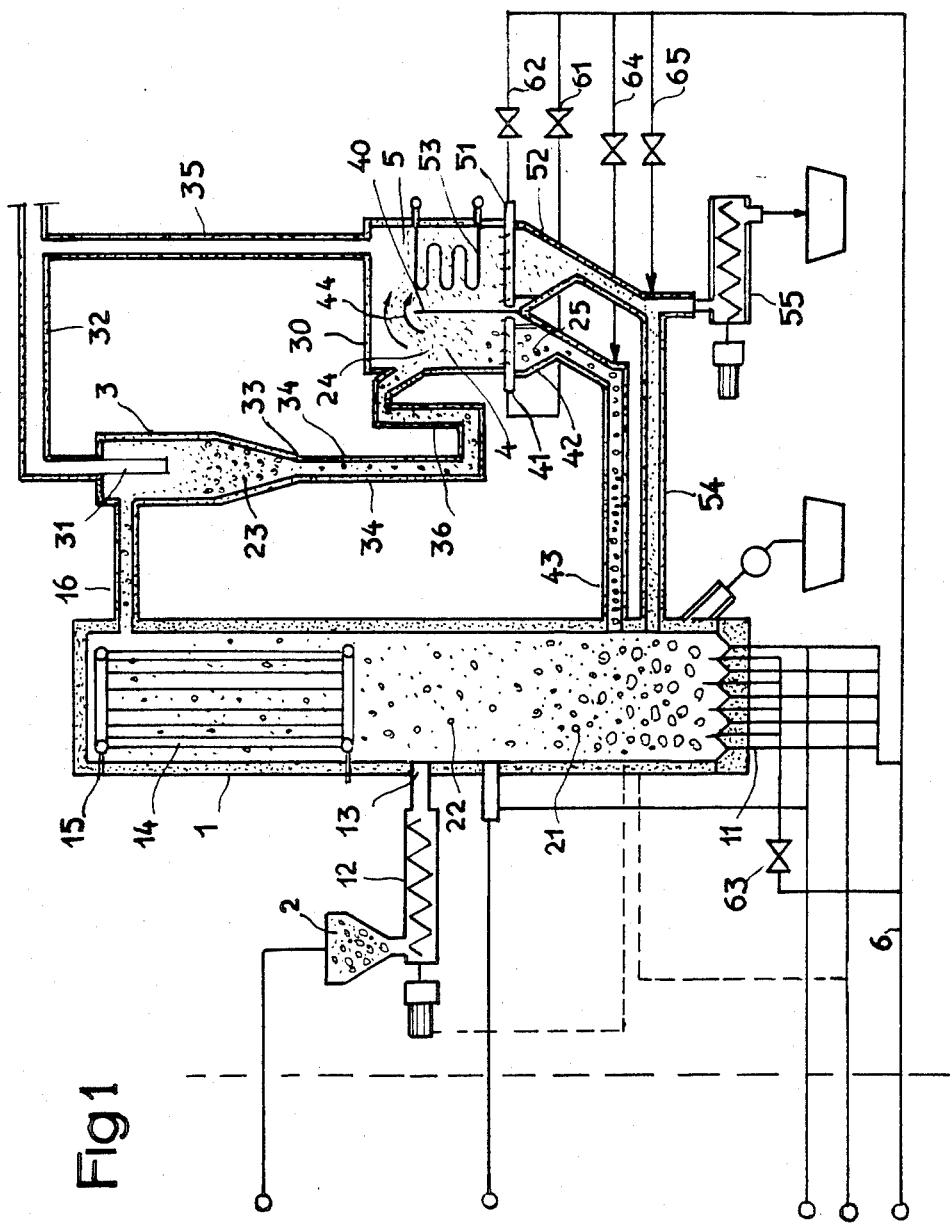
FIG. 1 is a general assembly view of an installation producing steam by fluidized bed combustion and improved in accordance with the invention.

FIG. 1 shows a steam-producing boiler comprising a fluidized bed reactor formed by an elongated chamber 1 having a vertical axis and covered with a refractory lining. This chamber is fed with material 2 to be processed, in the form of particles, for example a fuel, by a feed device 12 formed, for example, by a charging hopper connected to a screw feed device opening onto the interior of the reactor 1 through an orifice 13. The reactor 1 is provided at its base with particle fluidization means formed, in the illustrated embodiment, from a plurality of injection systems 11 for a fluidization gas which may be, for example, a mixture of air and a combustible gas which burns at its outlet in the reactor 1. In the upper part of the latter, there is moreover provided a tubular exchanger 14 formed by a nest of tubes supplied with water and delivering the steam to a utilization circuit.

The rate of flow of the injection systems 11 is so regulated that the fluidization speed is sufficient to produce an operation with a circulating bed. The particles 2 then form, inside the chamber 1, a fluidized bed comprising a dense zone 21 surmounted by a diluted zone 22 containing a high proportion of particles entrained with the gases.

The fluidization gases which mix with the fumes issuing from the combustion are discharged with the entrained particles in the upper part of the chamber 1 through a discharge conduit 16 which opens into a separator 3, for example comprising a cyclone including an axial flue 31 for discharging the purified gases to a fume pipe 32 and having a bottom wall in the shape of a hopper which opens onto a discharge circuit 34 for the recovered particles 23 through a lower outlet 33. The circuit 34 passes through a processing chamber 30, namely a heat exchanger, for recovering a part of the internal heat of the recycled particles before the latter are re-introduced in the fluidization chamber 1.

According to the essential feature of the invention, the processing compartment 30 in formed by two assembled compartments 4 and 5 which are placed inside a common vessel 30 and separated by a partition wall 40.

Each of the two compartments is provided at its base with a system for injecting a fluidization gas, respectively 41, 51, and with a bottom wall in the shape of a hopper, respectively 42, 52, placed below the fluidization system and each opening into a specific circuit, respectively 43, 54, for recycling in the fluidized bed 21.

The two systems 41, 51 and the fluidization system 11 of the main chamber 1 are connected to a common circuit 6 supplying fluidization gas, for example air, each of the systems being provided with means for regulating the rate of flow, respectively 61, 62, 63.

According to an advantageous feature, the inlet/-syphon or trap 36, which is usually placed in the circuit 3 for recycling the particles before the inlet to the reactor 1, is provided in the presently described embodiment in the conduit for discharging the particles from the separator 3 and opens onto the upper part of the compartment 4 which thus receives all the particles 23 entrained with the gases and recovered in the separator 3. The processing device 30 is therefore isolated from the processing reactor 1 on the upstream side by the syphon 36 and on the downstream side by the recycling circuits 43 and 54 filled with material so that it is in particular possible to effect therein a fluidized bed processing.

In an operation with a circulating bed, the entrained particles 22 have a wide particle size spectrum. Owing to the means 6 for regulating the fluidization rate of flow injected by the system 41, the speed of fluidization may be regulated in such manner as to put into suspension in the compartment 4 only the particles 24 having dimensions smaller than a chosen limit. The largest particles 25, essentially formed by unburnt particles, therefore fall into the hopper 42 which communicates with a first circuit 43 recycling the particles 25 in the processing reactor 1, the recycling being facilitated by an injection of air with an adjustable rate of flow through a conduit 64 connected to the air circuit 6 and communicating with the upstream end of the recycling conduit 43.

There is thus carried out inside the compartment 4 a filtration of the particles, the finest particles 24, smaller than the chosen limit, being put into suspension and passing, by overflowing the top of the partition wall 40, through an upper outlet 44 and reaching the second compartment 5 in which the processing is carried out. In the illustrated embodiment, the compartment 5 is merely provided with a nest of tubes 53 supplied with water which vaporizes in the compartment 5 and recovers the heat of the fine particles, vapor formed being sent to the utilization circuit 15.

Owing to the arrangements according to the invention, the heat exchanger compartment 5 processes particles 24 having a homogeneous particle size, and consequently it is possible to regulate the rate of flow of the fluidization air injected by the system 51 in such manner as to achieve the heat exchange under optimum conditions. Indeed, the speed of fluidization is so regulated that the particles 24 coming from the filtration compartment 4 are simply put into suspension and slowly descend in contact with the exchange element 53, lose their heat and reach the hopper 52, which communicates with a second recycling circuit 54 also connected to a conduit 65 for injecting fluidization air, so as to facilitate the recycling.

To date, in view of the wide size range of the particles entering the exchanger, it was not possible to cool these particles in the same way, since the largest particles cool more slowly. In the arrangement according to the invention, the largest particles 25, essentially unburnt particles, are not cooled and therefore become rapidly re-ignited when they are re-injected in the fluidized bed. On the other hand, the heat exchange is effected under optimum conditions in contact with the fine particles 24 having a large proportion of ashes, the temperature of which can be more easily controlled.

The fluidization air injected by the systems 41 and 51 accumulates in the upper part of the vessel 30 and is discharged through an outlet conduit 35 connected to the fume or smoke pipe 32. The fumes can then be purified in the conventional manner in another separator and then pass through a heat recuperation device.

As the fine particles 24 cooled in the compartment 5 have a high proportion of ashes, it may be considered preferable to discharge the latter directly through a withdrawing device 55. In this case, there is only recycled through the circuit 54 the flow of cooled fine particles necessary to, for example, control the combustion temperature.

However, the invention may be constructed in accordance with an improved embodiment which is of particular utility when there is a large production of ashes, for example for the gasification of coal.

Figure 2:
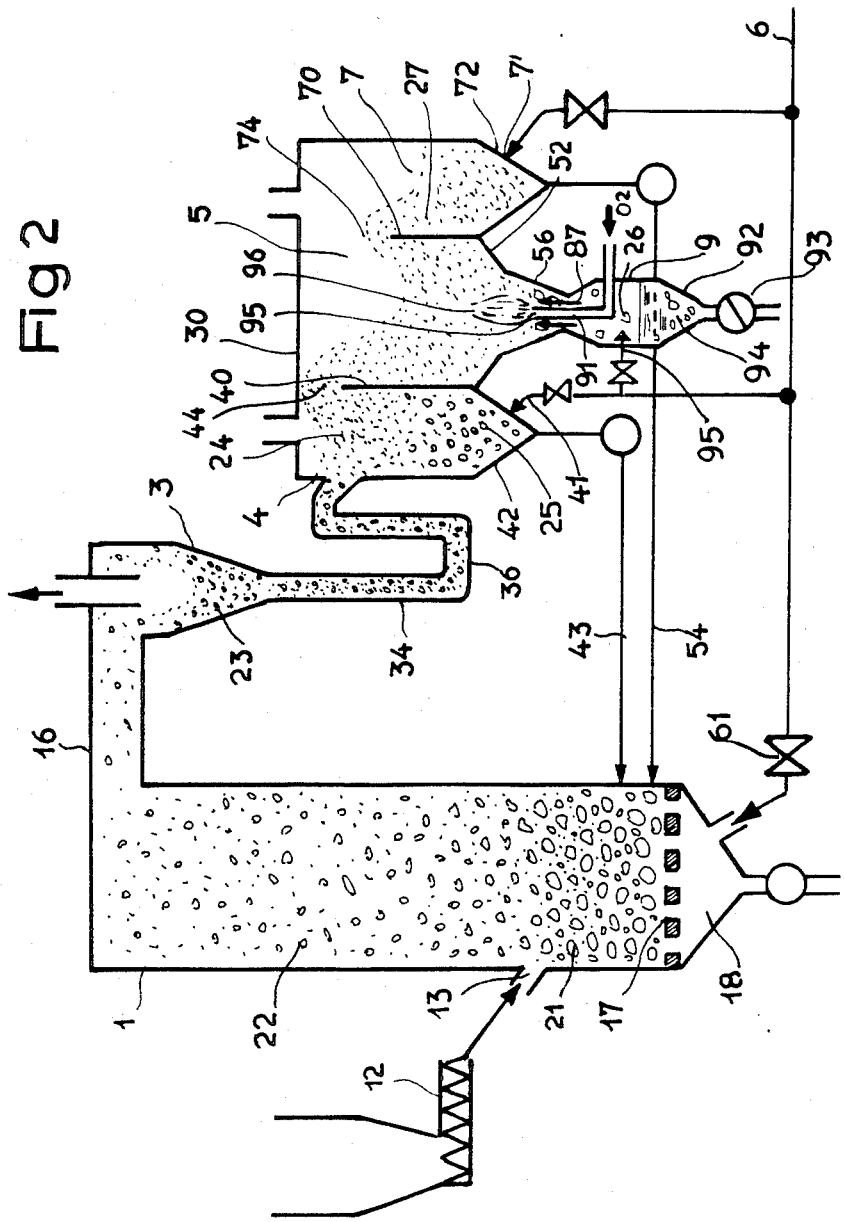
FIG. 2 is a diagrammatic view of a second embodiment of the invention.

In this embodiment, shown diagrammatically in FIG. 2, the gasification reaction is carried out in a fluidized bed in a reactor 1 provided at its base with fluidization means such as, for example, a distributing grating 17 surmounting a plenum 18 to which a fluidization gas supply circuit 61 is connected. The fuel, for example wood, is introduced through a metering device 12, and the speed of fluidization is so regulated that the speed of circulation of the gases inside the chamber 1 permits operating with a circulating bed. As before, the gases and the entrained particles pass into a separator 3 connected to the processing device 30 through the conduit 34. In the illustrated embodiment, the device 30 is formed by three adjacent compartments 4, 5 and 7 separated by partition walls 40 and 70 and each provided with a bottom wall in the shape of a hopper, respectively 42, 52, and 72.

The first compartment 4 operates in manner similar to that described before and filtrates the largest, unburnt particles 25, which are directly recycled in the fluidized bed by the first recycling circuit 43.

The finest particles 24, whose size is smaller than the limit size determined by the speed of the fluidization gas injected by the system 41, are entrained upwardly and overflow through the orifice 44 the top of the partition wall 40 and fall into the processing compartment 5. The latter is provided with a bottom wall in the shape of a hopper 52 extended by a tapered conduit 56 in the form of a venturi which communicates with a container formed by a lower chamber 9. Extending along the axis of the tapered conduit 56 is a conduit 91 of smaller diameter which defines a tapered annular space 87.

The lower chamber 9 is provided at its base with a hopper 92 which communicates with a withdrawlal device 93, for example in the form of a lock chamber which is filled with a liquid bath 94.

Opening out above this liquid bath is a conduit 95 for injecting a gaseous fluidization agent with an adjustable rate of flow. The fluidization gas, injected into the chamber 9, consequently rises in the compartment 5 and passes through the annular space 87 and ensures the fluidization of the particles 24 entering the compartment 5. These particles are formed by ashes and unburnt fine particles. The conduit 91 is supplied with a comburent gas, for example oxygen, and opens out at the center of the hopper 52. There is consequently formed at the center of the lower part of the compartment 5 a high temperature zone 96 in which the ashes are agglomerated. In agglomerating, these ashes form particles 26 which finally become too heavy to remain in suspension and fall into the tapered conduit 56 and then into the recuperation chamber 9. The agglomerated particles 26 are cooled in the liquid bath 94 and discharged by the withdrawal device 93. On the other hand, the fine, unburnt particles 27 do not agglomerate and remain in suspension in the agglomeration compartment 5 and overflow, through an upper outlet 74, the top of the partition wall 70 and fall into the third compartment 7 where they are stored before being recycled with an adjustable rate of flow in the fluidization reactor 1 through a second recycling circuit 54. A system 71 for fluidization of a gaseous agent is disposed at the base of the storage compartment 7 and enables the speed of fluidization to be regulated and consequently enables the rate of flow of recycled particles through the recycling circuit 54 to be controlled. Other flow regulating means may of course be employed. Certain processing operations may if desired be carried out on the particles 27 in the storage compartment 7.

Other embodiments of the invention could moreover be imagined while remaining within the scope of protection defined in the claims. Indeed, the separation of the particle sizes achieved in accordance with the invention in the recycling circuit could present advantages in other processing operations effected in a circulating bed, for example for the calcination of mineral materials, the processing of paper-making black liquors, the calcination of pyrites, etc.

What is claimed is:

1. In a method for gasifying a combustible material in a first circulating fluidized bed comprising introducing the material to be gasifying in the form of particles in a fluidization chamber provided at its base with means for effecting a fluidization by an ascending flow of a first fluidization gas at a speed which is so regulated as to operate as a circulating bed, discharging the gases and entrained particles through a discharge circuit connected to an upper part of the fluidization chamber and passing through a particle recovering means, returning the recovering particles to the first fluidized bed through a recycling circuit and subjecting the recovered particles in the return path to a processing which is carried out in a second fluidized bed in a device outside the fluidization chamber and comprising a filtration compartment traversed by a second fluidization gas and a processing compartment adjacent to said filtration compartment and separated by a first partition wall therefrom; the improvement comprising causing the second fluidization gas to traverse the filtration compartment at a speed which is so regulated as to put into suspension only fine particles having sizes smaller than a given limit, recovering the largest particles and directly recycling them in the first fluidized bed and flowing the fine particles over the first partition wall into the processing compartment and subjecting the fine particles to a processing with a comburent gas in the processing compartment so as to agglomerate ashes by formation in the processing compartment of a high temperature zone, withdrawing the agglomerated ashes at the base of the processing compartment and returning unburnt fine particles to the first fluidized bed through a second recycling circuit by flowing the unburnt fine particles over a second partition wall to an adjacent storage compartment and returning the unburnt fine particles to the first fluidized bed from the bottom of said storage compartment.

* * * * *